(12) United States Patent
Lim et al.

(10) Patent No.: US 10,101,242 B2
(45) Date of Patent: Oct. 16, 2018

(54) APPARATUS AND METHOD FOR MEASURING NOISE

(71) Applicants: HYUNDAI MOTOR COMPANY, Seoul (KR); SM Instruments Co., Ltd., Daejeon (KR)

(72) Inventors: Kyoung Sil Lim, Seoul (KR); Tae-Woong Lee, Busan (KR); Young-Key Kim, Daejeon (KR)

(73) Assignees: HYUNDAI MOTOR COMPANY, Seoul (KR); SM INSTRUMENTS CO., LTD., Daejeon (KR)

( * ) Notice: Subject to any disclaimer, the term of this patent is extended or adjusted under 35 U.S.C. 154(b) by 148 days.

(21) Appl. No.: 15/188,647

(22) Filed: Jun. 21, 2016

(65) Prior Publication Data

US 2017/0108409 A1 Apr. 20, 2017

(30) Foreign Application Priority Data

Oct. 20, 2015 (KR) ........................ 10-2015-0145808

(51) Int. Cl.
*G01M 17/007* (2006.01)
*G01M 17/00* (2006.01)
*G01H 13/00* (2006.01)
*G01H 3/08* (2006.01)

(52) U.S. Cl.
CPC ............ *G01M 17/007* (2013.01); *G01H 3/08* (2013.01); *G01H 13/00* (2013.01)

(58) Field of Classification Search
CPC .......... G01H 13/00; G01H 3/08; G01H 17/00; G01M 17/007
See application file for complete search history.

(56) References Cited

U.S. PATENT DOCUMENTS

| | | | | | |
|---|---|---|---|---|---|
| 5,479,823 | A | * | 1/1996 | Van Hout | G01M 17/007 73/579 |
| 5,551,298 | A | * | 9/1996 | Rayment | G01M 7/025 73/579 |
| 5,907,622 | A | * | 5/1999 | Dougherty | H03G 3/32 381/108 |
| 6,438,238 | B1 | * | 8/2002 | Callahan | A61B 5/6843 181/131 |

(Continued)

FOREIGN PATENT DOCUMENTS

| | | |
|---|---|---|
| JP | H07294567 A | 11/1995 |
| JP | 2008-273474 A | 11/2008 |

(Continued)

OTHER PUBLICATIONS

Notice of Allowance issued in Korean Patent Application No. 10-2015-0145808, dated May 26, 2017.

*Primary Examiner* — Helen Kwok
(74) *Attorney, Agent, or Firm* — McDermott Will & Emery LLP (57) ABSTRACT

An apparatus for measuring noise includes: a signal generator configured to input an input signal having an excitation frequency to an audio device; and a controller configured to measure rattle noise from a sound pressure signal generated in response to the input signal. The controller measures the rattle noise by comparing a frequency component of the sound pressure signal with a masking curve corresponding to the excitation frequency.

14 Claims, 9 Drawing Sheets

(56) References Cited

U.S. PATENT DOCUMENTS

| | | | | |
|---|---|---|---|---|
| 6,650,757 B1* | 11/2003 | Zhou | ............ | G01H 1/00 |
| | | | | 381/71.1 |
| 2003/0154054 A1* | 8/2003 | Charette | ............ | G01M 17/007 |
| | | | | 702/188 |
| 2005/0213776 A1* | 9/2005 | Honji | ............ | H03G 3/32 |
| | | | | 381/86 |
| 2008/0285775 A1* | 11/2008 | Christoph | ............ | H03G 3/32 |
| | | | | 381/99 |
| 2009/0146799 A1* | 6/2009 | Goldstein | ............ | B60Q 5/00 |
| | | | | 340/463 |
| 2011/0249826 A1* | 10/2011 | Van Leest | ............ | G10K 11/178 |
| | | | | 381/71.8 |
| 2011/0267185 A1* | 11/2011 | Zhang | ............ | G07C 5/008 |
| | | | | 340/437 |
| 2014/0100714 A1 | 4/2014 | Linn et al. | | |
| 2015/0043744 A1* | 2/2015 | Lagodzinski | ............ | H04R 3/002 |
| | | | | 381/73.1 |
| 2016/0196818 A1* | 7/2016 | Christoph | ............ | G10K 11/1786 |
| | | | | 381/71.6 |

FOREIGN PATENT DOCUMENTS

| | | | |
|---|---|---|---|
| JP | 2012026870 A | | 2/2012 |
| KR | 10-1997-0070502 A | | 11/1997 |
| KR | 10-2004-0046820 A | | 6/2004 |
| KR | 10-2005-0039352 A | | 4/2005 |

\* cited by examiner

APPARATUS AND METHOD FOR MEASURING NOISE

CROSS-REFERENCE TO RELATED APPLICATION

This application claims the benefit of priority to Korean Patent Application No. 10-2015-0145808, filed on Oct. 20, 2015 in the Korean Intellectual Property Office, the disclosure of which is incorporated herein by reference.

TECHNICAL FIELD

The present disclosure relates to an apparatus and a method for measuring noise of a vehicle.

BACKGROUND

In the past, driving, braking, steering, etc. of a vehicle as basic performances have been measured for vehicle development, for example, vehicle performance can be predicted on the basis of the measured basic performances. However, with the increasing development of technology applied to vehicles to be mass-produced, the standards to satisfy basic performances have been increasing.

Therefore, the auto industry has been focused on development and evaluation of vehicle technologies in consideration of actual users of vehicles, rather than merely relying on vehicle performance. In more detail, user interest in technology for providing pleasant or comfortable environment is rapidly increasing for drivers and passengers.

As one example, a noise reduction technology for providing passengers in a vehicle with quiet or silent environment has been developed. The noise reduction technology may include various technologies capable of reducing not only noise generated during a stop or driving state of the vehicle, but also buzz, squeak, rattle (BSR) noise that intermittently occurs and causes the passengers an unpleasant feeling.

SUMMARY

An aspect of the present disclosure provides an apparatus and method for measuring noise so as to measure rattle noise by comparing a frequency component of a sound pressure signal generated from a speaker with a masking curve.

Additional aspects will be set forth in part in the description which follows and, in part, will be obvious from the description, or may be learned by practice of the invention.

In accordance with an embodiment in the present disclosure, a noise measurement apparatus includes: a signal generator configured to input an input signal having an excitation frequency to an audio device; and a controller configured to measure rattle noise from a sound pressure signal generated in response to the input signal. The controller measures the rattle noise by comparing a frequency component of the sound pressure signal with a masking curve corresponding to the excitation frequency.

The controller may measure the rattle noise using values, which exceed the masking curve, among harmonic components of the sound pressure signal.

The controller may compare the masking curve indicating a relationship between an audible threshold value and a frequency variation with the frequency component of the sound pressure signal.

The controller may perform Fourier Transform of the sound pressure signal, and may compare the frequency component of the sound pressure signal with the masking curve corresponding to the excitation frequency.

The controller may confirm the excitation frequency from the Fourier-Transformed sound pressure signal, and may compare the masking curve corresponding to the excitation frequency with the frequency component of the sound pressure signal.

The signal generator may input the input signal in which the excitation frequency is successively changed during a reference period of time to the audio device.

The controller may obtain the relationship between the rattle noise and a change of the excitation frequency.

The controller may confirm a change of the rattle noise during the reference period of time.

The noise measurement apparatus may further include: a microphone configured to obtain a sound pressure signal generated in response to the input signal.

The noise measurement apparatus may further include: a display unit configured to visually display the measured rattle noise.

In accordance with another embodiment in the present disclosure, a noise measurement method includes: inputting an input signal having an excitation frequency to an audio device; measuring rattle noise from a sound pressure signal generated in response to the input signal, wherein the measuring the rattle noise includes measuring the rattle noise by comparing a frequency component of the sound pressure signal with a masking curve corresponding to the excitation frequency.

The step of measuring the rattle noise may include: measuring the rattle noise using values, which exceed the masking curve, among harmonic components of the sound pressure signal.

The step of measuring the rattle noise may include: comparing the masking curve indicating a relationship between an audible threshold value and a frequency variation with the frequency component of the sound pressure signal.

The step of measuring the rattle noise may include: performing Fourier Transform of the sound pressure signal, and comparing the frequency component of the sound pressure signal with the masking curve corresponding to the excitation frequency.

The step of measuring the rattle noise may include: confirming the excitation frequency from the Fourier-Transformed sound pressure signal, and comparing the masking curve corresponding to the excitation frequency with the frequency component of the sound pressure signal.

The step of inputting the input signal to the audio device may include: inputting the input signal in which the excitation frequency is successively changed during a reference period of time to the audio device.

The step of measuring the rattle noise may include: obtaining the relationship between the rattle noise and a change of the excitation frequency.

The step of measuring the rattle noise may include: confirming a change of the rattle noise during the reference period of time.

The noise measurement method may further include: obtaining a sound pressure signal generated in response to the input signal.

The noise measurement method may further include: visually displaying the measured rattle noise.

BRIEF DESCRIPTION OF THE DRAWINGS

These and/or other aspects of the invention will become apparent and more readily appreciated from the following description of the embodiments.

DETAILED DESCRIPTION

Reference will now be made in detail to the embodiments in the present disclosure, examples of which are illustrated in the accompanying drawings, wherein like reference numerals refer to like elements throughout. An apparatus and method for measuring noise according to the present disclosure will hereinafter be described with reference to the attached drawings.

Figure 1:
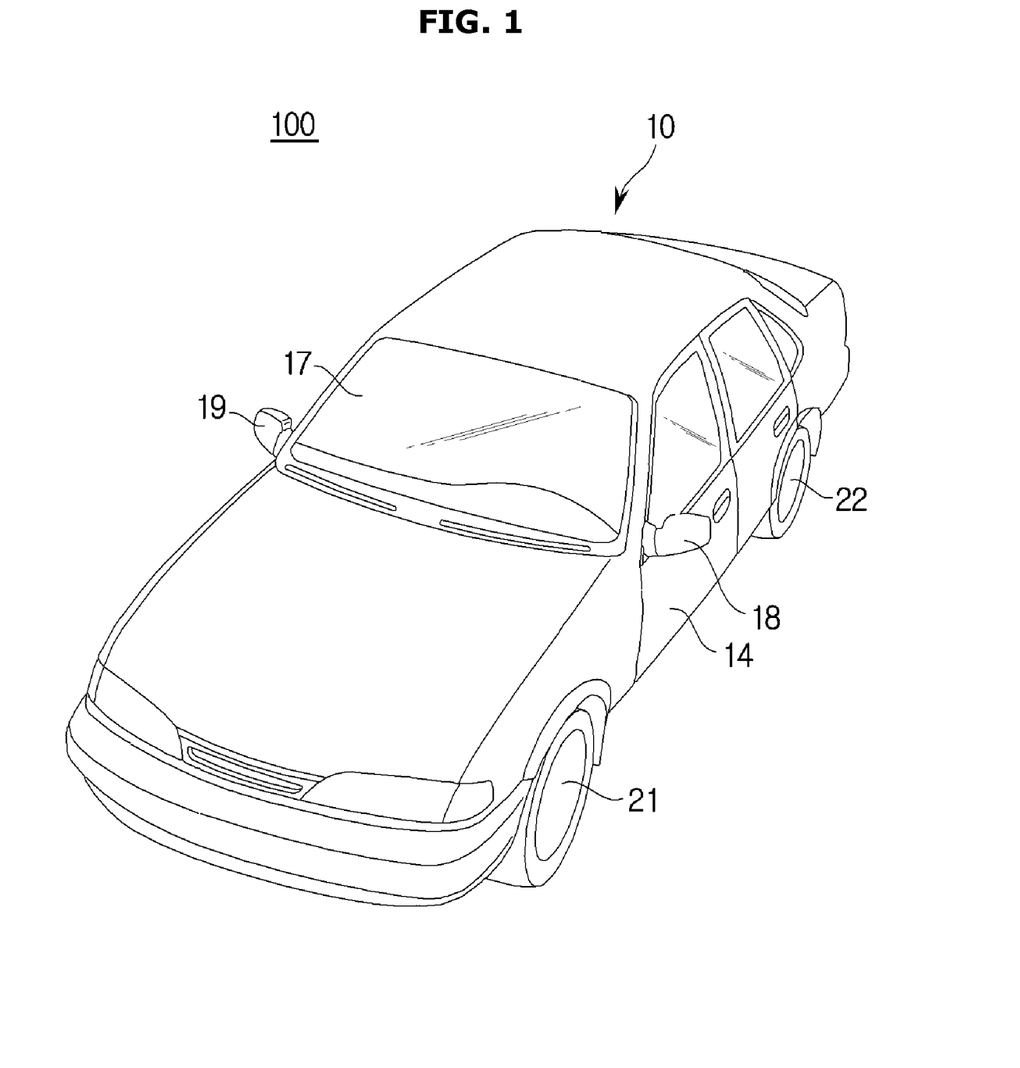
FIG. 1 is a perspective view illustrating an appearance of a vehicle according to an embodiment in the present disclosure.

FIG. 1 is a perspective view illustrating an appearance of a vehicle according to an embodiment in the present disclosure.

Referring to FIG. 1, a vehicle 100 includes a main body 10 forming the appearance of the vehicle 100, vehicle wheels 21, 22 to move the vehicle 100 from place to place, doors 14 to shield an indoor space of the vehicle 100 from outside, a vehicle windshield 17 to provide a forward view of the vehicle 100 to a vehicle driver who rides in the vehicle 100, and side-view mirrors 18, 19 to provide a rear view of the vehicle 100 to the vehicle driver.

The wheels 21, 22 may include front wheels 21 provided at the front of the vehicle 100 and rear wheels 22 provided at the rear of the vehicle 100. The front wheels 21 or the rear wheels 22 may receive rotational force from a drive unit to be described later in a manner that the main body 10 moves forward or backward.

The doors 14 are rotatably provided at the right and left sides of the main body 10 so that a vehicle driver can ride in the vehicle 100 when any of the doors 14 is open and an indoor space of the vehicle 100 can be shielded from the outside when the doors 14 are closed.

The windshield 17 is provided at a front upper portion of the main body 10 so that a vehicle driver who rides in the vehicle 100 can obtain visual information of a forward direction of the vehicle 100. The windshield 17 may also be referred to as a windshield glass.

The side-view mirrors 18, 19 may include a left side-view mirror 18 provided at the left of the main body 10 and a right side-view mirror 19 provided at the right of the main body 10, so that the driver who rides in the vehicle 100 can obtain visual information of the lateral and rear directions of the vehicle 100.

Figure 2:
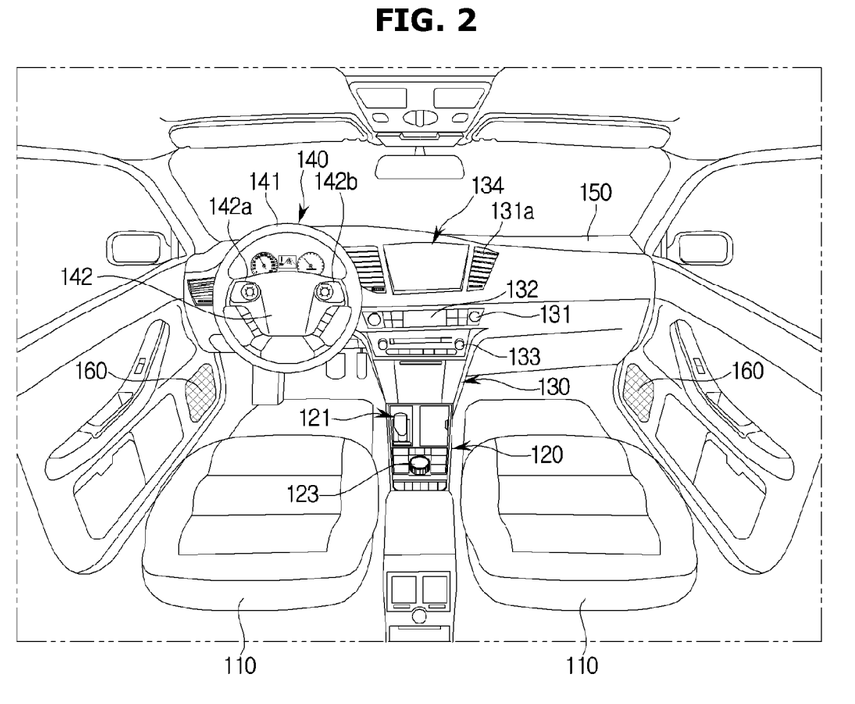
FIG. 2 is a view illustrating an internal structure of a vehicle according to an embodiment in the present disclosure.

FIG. 2 is a view illustrating an internal structure of a vehicle according to an embodiment in the present disclosure.

Referring to FIG. 2, the vehicle 100 may include: a seat 110 on which a passenger is seated; a dashboard 150 including a gearbox 120, a center fascia 130, a steering wheel 140, and the like; and a speaker 160.

A gearshift 121 for changing gears may be installed at the gearbox 120. In addition, as can be seen from FIG. 2, a dial manipulation unit 123 for allowing a user to control a navigation device (not shown) or the principal functions of the vehicle may be installed at the gearbox 120.

The steering wheel 140 is a device that adjusts a traveling direction of the vehicle 100, is connected to a rim 141 grasped by the vehicle driver and a steering device of the vehicle 100, and includes a spoke 142 to connect the rim 141 to a hub of a rotation axis for steering. Here, the spoke 142 may include various devices embedded in the vehicle 100, for example, manipulation devices 142a, 142b for controlling the audio device, etc.

The center fascia 130 embedded in the dashboard 150 may include an air-conditioner 131, a clock 132, an audio device 133, a display 134, etc.

The air-conditioner 131 can maintain temperature, humidity, purity, and airflow of indoor air of the vehicle 100 in a comfortable or pleasant condition. The air-conditioner 131 may be installed at the center fascia 130, and may include at least one air outlet 131a through which air is discharged to the outside. A button or dial for controlling the air-conditioner 131 may be installed at the center fascia 130. A user such as a vehicle driver may control the air-conditioner 131 of the vehicle using the button or dial mounted to the center fascia 130.

The clock 132 may be located in the vicinity of the button or dial for controlling the air-conditioner 131.

The audio device 133 may include a manipulation panel including a plurality of buttons for performing functions of the audio device 133. The audio device 133 may provide a radio mode for providing a radio function and a media mode for reproducing audio files stored in various storage media.

The display 134 may output information associated with the vehicle 100 in the form of an image or text. For example, upon receiving an output signal for controlling the vehicle 100 to output a recommended traveling method, the display 134 may output the recommended traveling method corresponding to the output signal in the form of an image or text, such that passengers of the vehicle can recognize the recommended traveling method through the display 134.

For this purpose, the display 134 may be embedded in the center fascia 130. However, the scope or spirit of installation examples of the display 134 is not limited thereto, and the display 134 may be detachably coupled to the center fascia 130 of the vehicle 100.

The display 134 may be implemented by any one of a liquid crystal display (LCD), a light emitting diode (LED), a plasma display panel (PDP), an organic light emitting diode (OLED), a CATHODE RAY TUBE (CRT), etc., without being limited thereto.

In addition, the dashboard 150 may include various instrument panels on which a vehicle speed, revolutions per minute (rpm) of an engine, and remaining fuel quantity can be displayed, and may further include a glove box in which various goods can be stored.

The speaker 160, which outputs an acoustic or sound signal, may be embedded in the vehicle 100. The speaker 160 may audibly output information related to the vehicle 100. Although the speaker may be located inside the doors 14 of the vehicle 100 as shown in FIG. 2, the scope of the installation position of the speaker is not limited thereto.

As the number of use purposes of the vehicle 100 is gradually increased, the function for providing the pleasant or comfortable environment to passengers who rides in the vehicle 100 becomes more significant. Although noise generated when the vehicle travels or stops moving has caused an unexpected problem in the conventional art, the necessity of reducing buzz, squeak, rattle (BSR) noises intermittently generated in the vehicle 100 has recently been increased.

Specifically, rattle noise among BSR noises may indicate impulsive noise generated when different components facing each other collide with each other by vibration or shock. If the speaker 160 is located inside the doors of the vehicle 100 as shown in FIG. 2, rattle noise may occur when the audio device 133 outputs sound through the speaker 160. If the output sound includes a resonance frequency of the vehicle 100, the speaker 160 may output sound through excitation of the speaker 160, the doors, and the constituent components adjacent thereto.

Prior to reducing rattle noise, there is a need to quantitatively measure the rattle noise. The noise measurement apparatus 200 to quantitatively measure the rattle noise and the noise measurement method for the same will hereinafter be given.

Figure 3:
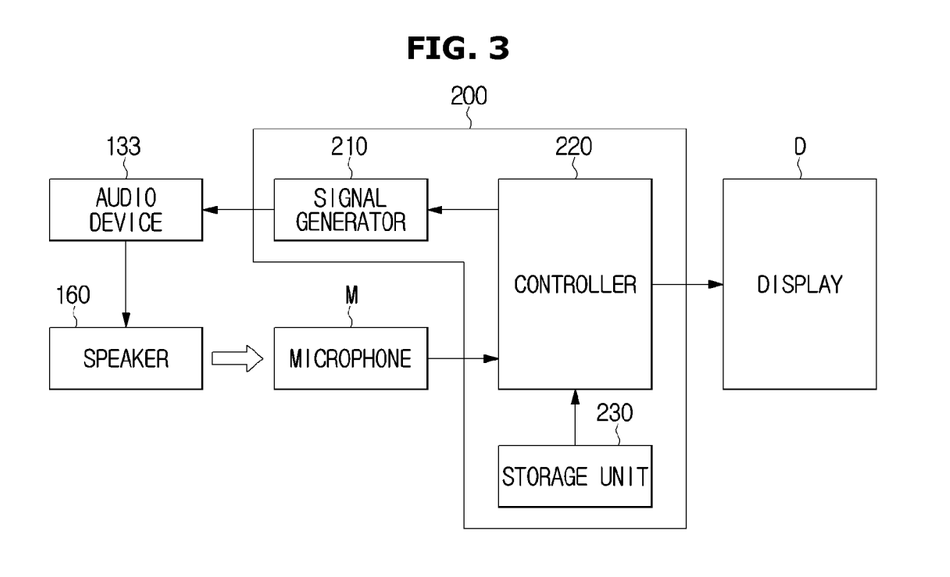
FIG. 3 is a block diagram illustrating a noise measurement apparatus according to an embodiment in the present disclosure.

FIG. 3 is a block diagram illustrating a noise measurement apparatus according to an embodiment in the present disclosure.

Referring to FIG. 3, a noise measurement apparatus 200 according to the present disclosure may include: a signal generator 210 configured to input an input signal having an excitation frequency to the audio device 133; a controller 220 configured to measure rattle noise from a sound pressure signal generated in response to the input signal; and a storage 230 configured to store a variety of data types needed to measure noise and/or application therein.

The signal generator 210 may generate the input signal in a manner that the sound pressure signal can be output through the speaker 160, and may then input the input signal to the audio device 133. The input signal generated by the signal generator 210 may have excitation frequency, and the excitation frequency may include a resonance frequency of the vehicle 100.

In this case, the signal generator 210 may generate the input signal in which the excitation frequency is successively changed for a predetermined time. In more detail, the signal generator 210 may generate the input signal (i.e., a sweep signal) in which the excitation frequency is successively increased or decreased for the predetermined time. The sweep signal may include, for example, a sine sweep signal. The sine sweep signal may indicate a sinusoidal signal having an excitation frequency $f0(t=t0)$ at an arbitrary time (t0).

If the input signal is applied to the audio device 133, the audio device 133 may output sound through the speaker 160 embedded in the vehicle 100. The output sound may be obtained in the form of a sound pressure signal from a microphone (M).

If the signal generator inputs the sine sweep signal acting as the input signal to the audio device 133, the sound pressure signal obtained from the microphone (M) may be a set (or aggregate) of the sound pressure signals corresponding to sinusoidal waves having the excitation frequency at respective time points.

The controller 220 may measure rattle noise from the obtained sound pressure signal. For this purpose, the controller 220 may perform Fourier Transform of the obtained sound pressure signal so as to analyze the frequency component of the sound pressure signal.

Figure 4:
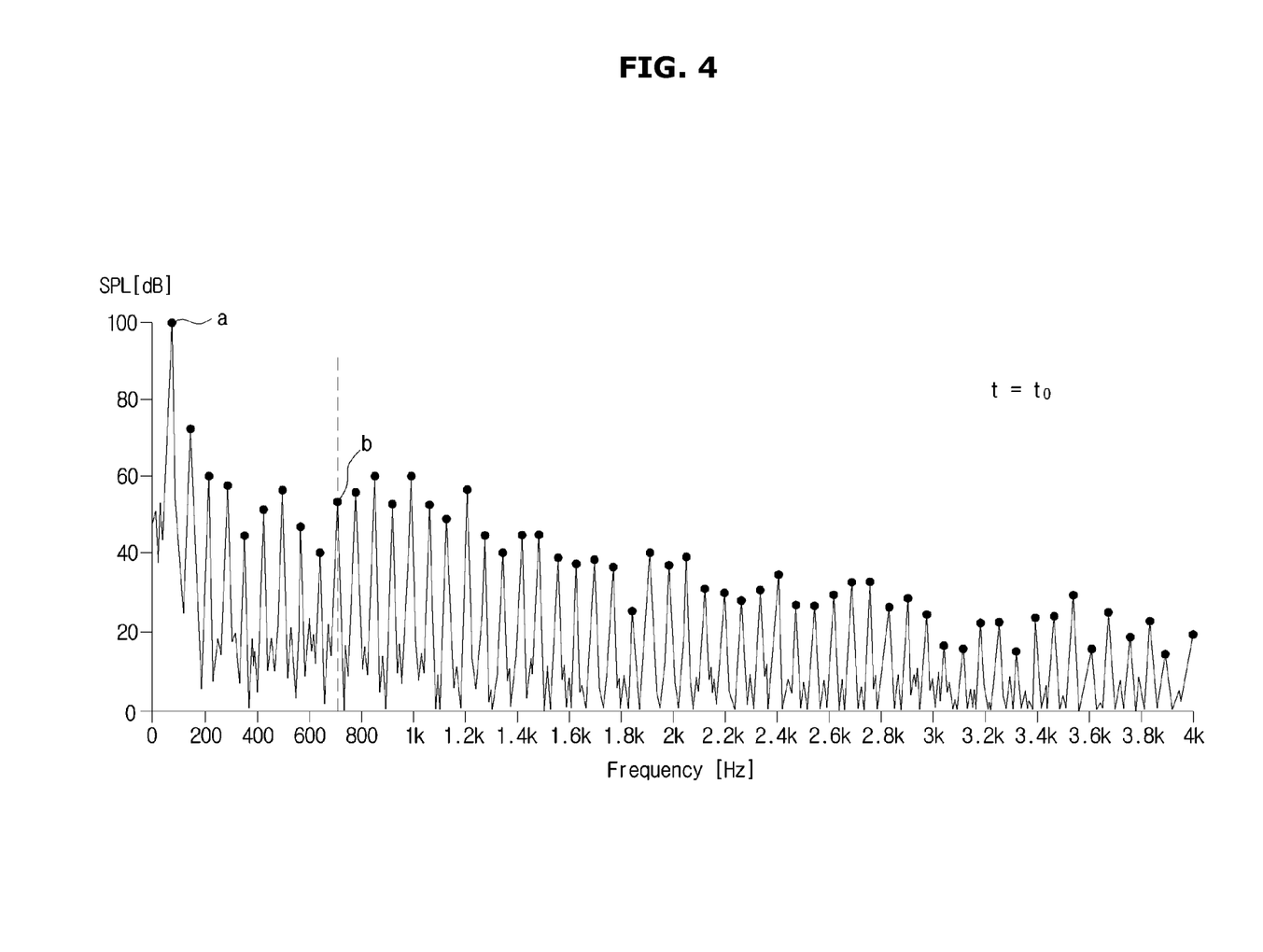
FIG. 4 is a graph illustrating sound pressure signals depicted on a frequency domain according to an embodiment in the present disclosure.

FIG. 4 is a graph illustrating sound pressure signals depicted on a frequency domain according to an embodiment in the present disclosure. FIG. 4 is a graph illustrating the sound pressure signals obtained in response to the input signal having the excitation frequency (f0) at an arbitrary time (t=t0). In FIG. 4, a horizontal axis may denote frequencies (Hz) of the sound pressure signals, and a vertical axis may denote sound pressure levels (SPLs) of the sound pressure signals.

Referring to FIG. 4, the sound pressure signal may include fundamental waves in which the excitation frequency (f0) is used as the fundamental frequency, and harmonic waves in which an integer multiple of the excitation frequency (f0) is used as the harmonic frequency. In FIG. 4, 'a' among dotted peak values may denote a sound pressure level (SPL) of the fundamental waves, and the remaining peak value may denote a sound pressure level (SPL) of the harmonic waves.

A representative one of various methods for measuring rattle noise is a Rub&Buzz method. The Rub&Buzz method may measure rattle noise in consideration of harmonic distortion compared with the excitation frequency. In this case, the Rub&Buzz method may measure the rattle noise using the sum of predetermined orders (e.g., $10^{th}$ order or higher), and the measured rattle noise may be rattle index (RI).

In FIG. 4, 'b' may denote a sound pressure level (SPL) of the $10^{th}$ order harmonic waves. According to the Rub&Buzz method, the rattle index (RI) value can be measured on the basis of the SPL value (b) and the sum of harmonic components located to the right of the SPL value (b).

If the sound pressure signal obtained by the microphone M indicates the set of sound pressure signals corresponding to sinusoidal waves having the excitation frequency at each time point, the controller 220 may measure the RI value corresponding to respective time points.

Figure 5:
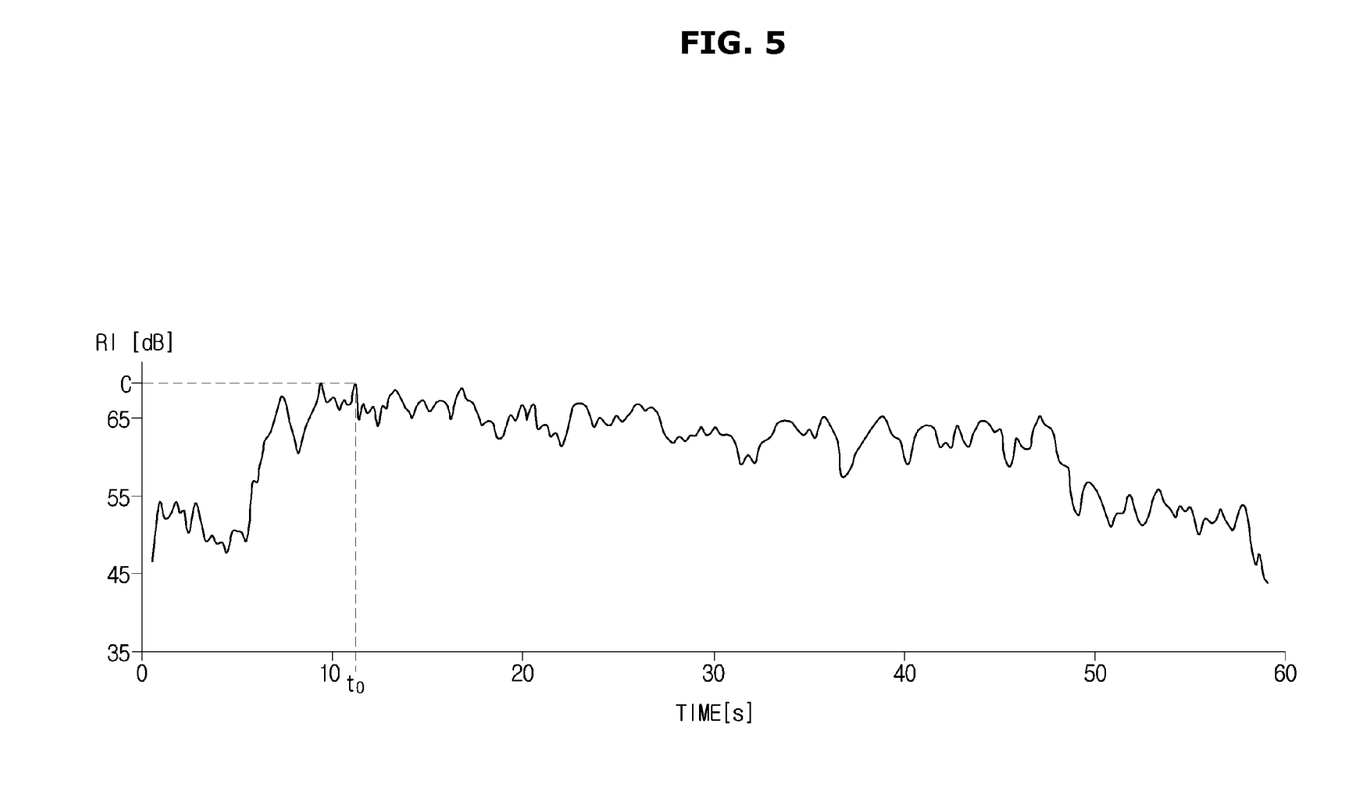
FIG. 5 is a graph illustrating rattle noise values depicted on a time domain according to the related art.

FIG. 5 is a graph illustrating rattle noise values depicted on a time domain according to the related art. In FIG. 5, a horizontal axis may denote a time at which the input signal is input to the audio device 133 or may denote a time at which the sound pressure signal is obtained by the microphone M. In FIG. 5, a vertical axis may denote the RI value measured at the corresponding time.

In FIG. 4, the controller 220 may measure the RI value at a specific time (t=t0). If the sound pressure is successively obtained by the microphone M for a predetermined time, the controller 220 may measure the RI value for the predetermined time. As a result, the controller 220 may recognize the change of rattle noise generated during the predetermined time.

In addition, the controller 220 may visually display a graph illustrating rattle noise values depicted on a time domain through a display. A user may visually recognize the graph displayed on the display, such that the user can recognize the degree of rattle noise of the vehicle 100 with respect to the excitation frequency.

However, assuming that the rattle noise is quantified using the sum of harmonic components of a predetermined order or higher, the result different from hearing characteristics of the passenger who rides in the vehicle may occur because the masking effect can be applied to a case in which the passenger receives sound from the vehicle 100.

The masking effect and the masking curve will hereinafter be described with reference to FIG. 6.

The masking effect may be a representative example of various human hearing characteristics as described above. The masking effect may refer to a phenomenon whereby a sound signal with a low intensity (i.e., maskee) is made inaudible by a stronger sound signal (i.e., masker). That is, the audible threshold of the maskee may increase by the masker.

The masking effect may be dependent upon the masker size and the intermediate frequency (IF) of the masker, and the masking curve may indicate the relationship among the masking effect, the masker size and the intermediate frequency (IF) of the masker.

Figure 6:
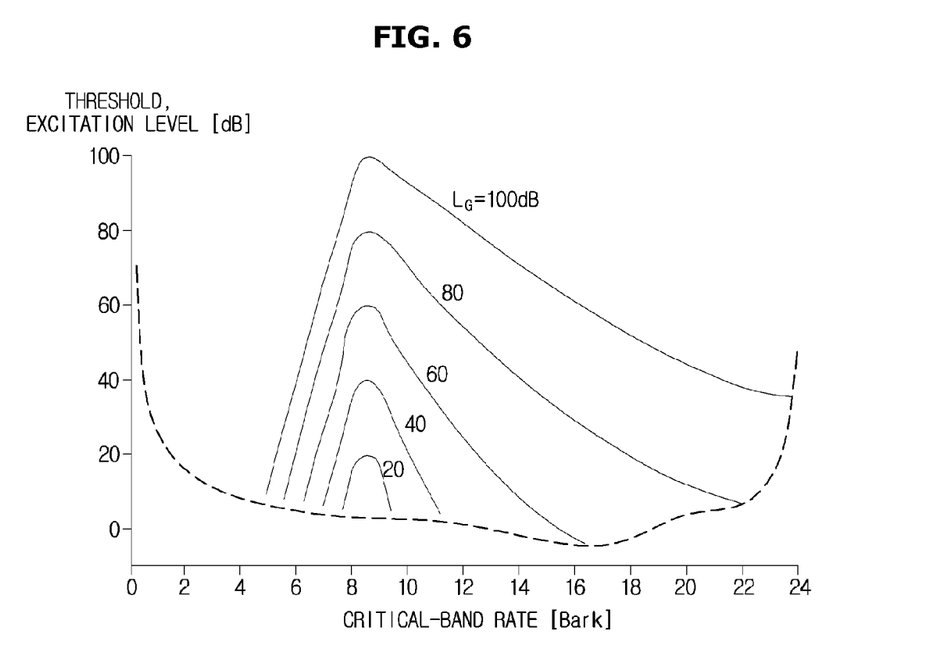
FIG. 6 illustrates a masking curve according to an embodiment in the present disclosure.

FIG. 6 illustrates the masking curve according to an embodiment in the present disclosure. In FIG. 6, a horizontal axis may denote a critical band within a Bark domain, and the vertical axis may denote a threshold excitation level. In FIG. 6, it is assumed that the intermediate frequency (IF) of the masker is set to 1 KHz.

The masking curve of FIG. 6 may be represented by the following equation 1. (Ernst Terhardt, "Calculating virtual pitch", Hearing research 1, 1979, pp. 155-182.)

$$M_{f_0}(f) = \begin{cases} SPL[f_0] - S_2(Z_{f_0} - Z_f) & f_0 < f \\ SPL[f_0] - S_1(Z_{f_0} - Z_f) & f_0 > f \end{cases} \quad \text{[Equation 1]}$$

In Equation 1, 'f' may denote a limited bandwidth, 'f0' may denote the intermediate frequency (IF) of the masker, and SPL[f0] may denote a sound pressure level (SPL) of the frequency (f0). In addition, each of S1 and S2 is a constant or an invariable number, S1 may be 27 dB/Bark, and S2 may be $\{24+0.23(f0/kHz)^{-1} - 0.2SPL[f0]/dB\}$ dB/Bark. In addition, 'zf' may be $13.3 \tan^{-1}(0/75f/kHz)$ Bark.

That is, the masking curve may be denoted by a function regarding a limited bandwidth (f), and an upper region of the masking curve may denote an audible region of the human. In contrast, a sound signal having a sound pressure level (SPL) corresponding to a lower region of the masking curve is masked (or shielded), so that the sound signal may be made inaudible by human ears.

Therefore, the controller 220 may perform quantification of the rattle noise using the masking curve in consideration of psychoacoustic characteristics of a human being.

Figure 7:
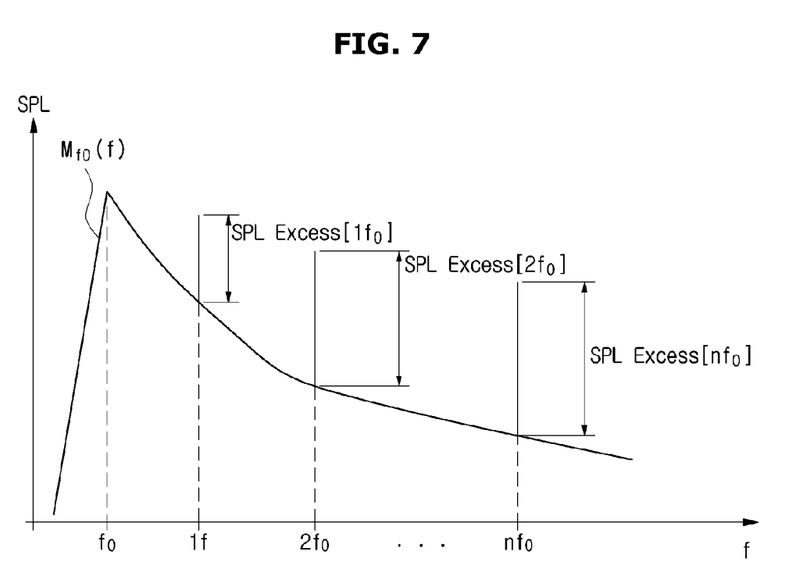
FIG. 7 is a conceptual diagram illustrating a quantitative method of rattle noise according to an embodiment in the present disclosure.

FIG. 7 is a conceptual diagram illustrating a quantitative method of rattle noise according to an embodiment in the present disclosure. In FIG. 7, a horizontal axis may denote a frequency in the Hz domain, and a vertical axis may denote a sound pressure level (SPL). In addition, FIG. 7 is a conceptual diagram illustrating an exemplary case in which the excitation frequency of the input signal is set to f0 (t=t0).

As described above, since the upper region of the masking curve may be an audible region of the human as described above, the controller 220 may confirm at least one value exceeding the masking curve among harmonic components of the obtained sound pressure signal.

Prior to execution of the above-mentioned confirmation process, the controller 220 may obtain the masking curve corresponding to the excitation frequency (f0) of the input signal. As a result, the rattle noise detected by human ears can be quantified, the intermediate frequency (IF) of the masking curve may be identical to the excitation frequency of the input signal. Therefore, the controller 220 may obtain the masking curve corresponding to the excitation frequency by substituting the excitation frequency of the input signal to the frequency (f0) shown in Equation 1.

Thereafter, the controller 220 may perform quantification of the rattle noise by comparing the obtained masking curve with harmonic components of the sound pressure signal (SPL). For this purpose, the controller 220 may obtain a Rattle by Over SPL Excess (ROSE) value using the following equation 2.

$$ROSE[dB] = 10 \log_{10}\left(\sum_{n=1}^{\infty} 10^{\frac{SPL Excess[nf_0]}{20}}\right) \quad \text{[Equation 2]}$$

In Equation 2, SPL Excess[nf0] may be based on the following equation 3.

$$SPL\ Excess[nf_0] = SPL[nf_0] - M_{f_0}[nf_0] \quad \text{[Equation 3]}$$

In Equations 2 and 3, the controller 220 may confirm the harmonic component value exceeding the masking curve. If the frequency component of the sound pressure signal (SPL) overlaps with the masking curve as shown in FIG. 7, the values exceeding the masking curve may be detected by a human being. Therefore, the controller 220 may measure the ROSE acting as the rattle noise through the sum of the detected values.

Assuming that the sound pressure signal (SPL) obtained by the microphone M indicates the set (or aggregate) of sound pressure signals corresponding to sinusoidal waves having the excitation frequency at each time point, the controller 220 may measure the ROSE values corresponding to respective time points.

Figure 8:
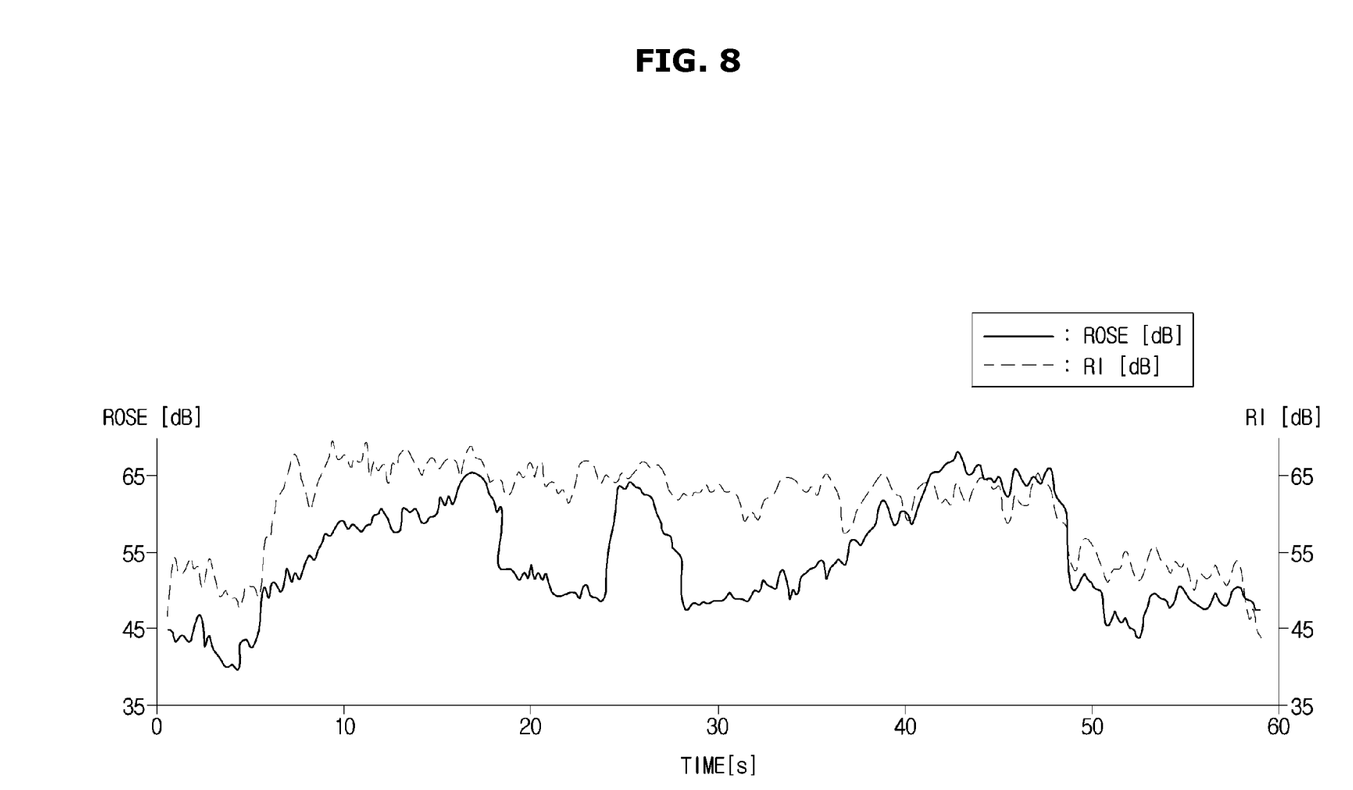
FIG. 8 is a graph illustrating rattle noise values depicted on a time domain according to an embodiment in the present disclosure.

FIG. 8 is a graph illustrating rattle noise values depicted on a time domain according to an embodiment in the present disclosure. In FIG. 8, a horizontal axis may denote a time at which the input signal is input to the audio device 133 or may denote a time at which the sound pressure signal is obtained by the microphone M. In FIG. 8, a vertical axis may denote the ROSE value measured at the corresponding time. For convenience of description and better understanding of the present disclosure, the RI graph of FIG. 5 will be added to FIG. 8, wherein the RI graph is denoted by dotted lines.

In FIG. 7, the controller 220 has measured the ROSE value at the time (t=t0). If the microphone M successively obtains the sound pressure signals (SPLs) for a predetermined time, the controller 220 may measure the ROSE value for predetermined time. As a result, the controller 220 may recognize the change of rattle noise generated for the predetermined time, as shown in FIG. 8. In addition, since respective times correspond to respective time-variable excitation frequencies, the controller 220 may also confirm the relationship between the change of such excitation frequency and the rattle noise as necessary.

Referring to FIG. 8, it can be recognized that ROSE and RI indicate different patterns. In this case, the ROSE value, that has been obtained in consideration of the masking effect, is designed to use more human hearing characteristics as compared to the RI value having been acquired as the sum of harmonic waves of $10^{th}$ order or higher, such that the ROSE value may be much more reliable than the RI value during rattle noise measurement.

In addition, the controller 220 may control the display to visually display the graph shown in FIG. 8 thereon. The user may visually recognize the graph displayed on the display, such that the user can recognize the degree of rattle noise of the vehicle 100 with respect to the excitation frequency.

The controller 220 may be implemented by hardware so as to measure the rattle noise, or the controller 220 may also perform the above-mentioned operations using software needed to measure the rattle noise. That is, the controller 220 may be implemented as a microprocessor configured to autonomously measure the rattle noise according to the above-mentioned steps, or may measure the rattle noise of the obtained sound pressure signal (SPL) by executing the application pre-stored in the storage 230.

Although the noise measurement apparatus 200 according to the present disclosure is exemplarily divided into the microphone M and the display (D) as shown in FIG. 3 for convenience of description, the noise measurement apparatus 200 according to another embodiment may include at least one of the microphone M and the display (D) as necessary.

Figure 9:
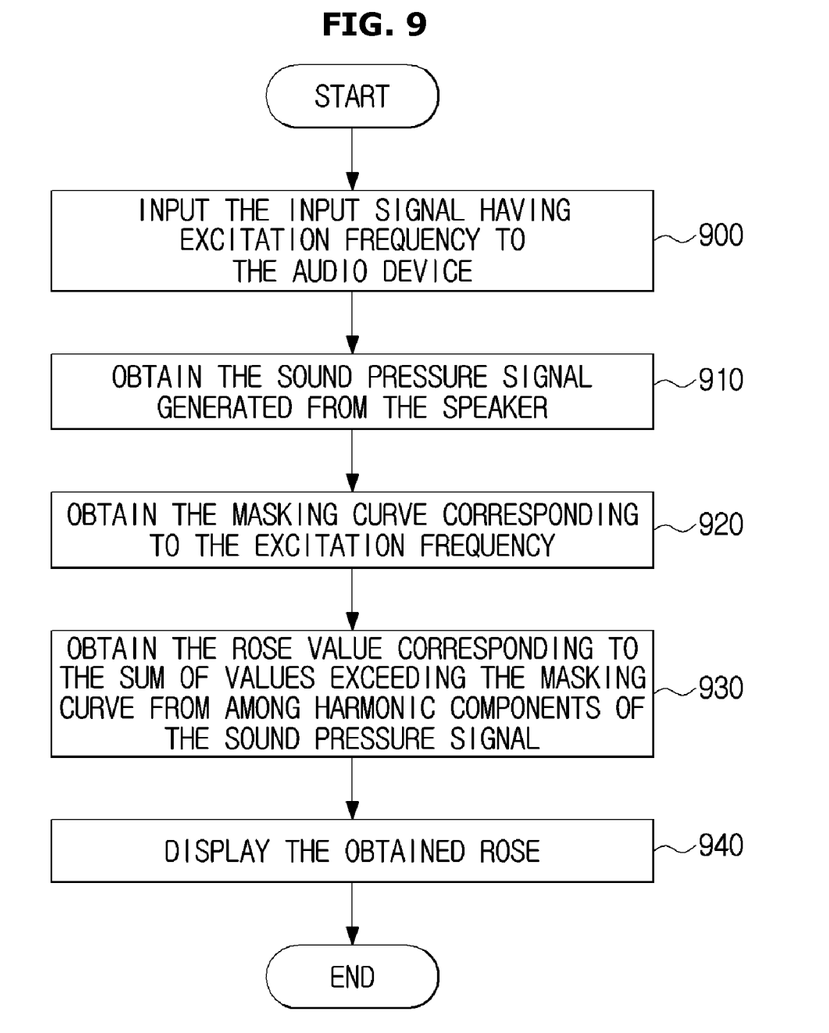
FIG. 9 is a flowchart illustrating a noise measurement method according to an embodiment in the present disclosure.

FIG. 9 is a flowchart illustrating a noise measurement method according to an embodiment in the present disclosure.

Referring to FIG. 9, the input signal having the excitation frequency may be input to the audio device 133 in operation 900. In this case, the excitation frequency may be a frequency causing vibration of the vehicle 100, such that the excitation frequency may include a resonance frequency of the vehicle 100.

Thereafter, the sound pressure signal (SPL) generated from the speaker 160 of the vehicle 100 can be obtained in operation 910. In more detail, the sound signal generated from the speaker 160 of the vehicle 100 may be converted into the sound pressure signal (SPL) through the microphone M.

After acquisition of the sound pressure signal (SPL), it may be possible to obtain the masking curve corresponding to the excitation frequency in operation 920. The masking curve may be a graph indicating audible threshold values changing in response to the masker size and the intermediate frequency (IF).

The masking curve is shown in Equation 1 above, and the masking curve corresponding to the excitation frequency may be a graph obtained by substituting the excitation frequency of the input signal into the intermediate frequency (IF) shown in Equation 1.

After acquisition of the masking curve, it may be possible to obtain the ROSE indicating the degree of rattle noise through the sum of values exceeding the masking curve among harmonic components of the sound pressure signals (SPLs) in operation 930. In this case, the harmonic components less than the masking curve are not detected by the human being due to the masking effect, such that the degree of rattle noise can be measuring only using some values exceeding the masking curve.

The method for obtaining the ROSE may be based on the above Equations 2 and 3.

Finally, the obtained ROSE value may be visually displayed in operation 940. The user may visually recognize the ROSE value, such that the user can objectively recognize the degree of rattle noise of the vehicle 100.

As is apparent from the above description, the apparatus and method for measuring noise according to the embodiments can use the masking curve to objectively measure the degree of rattle noise from the viewpoint of passengers who ride in the vehicle.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An apparatus for measuring noise, the apparatus comprising:
   a signal generator configured to input an input signal having an excitation frequency to an audio device; and
   a controller configured to measure a rattle noise from a sound pressure signal generated in response to the input signal,
   wherein the controller measures the rattle noise by comparing a frequency component of the sound pressure signal with a masking curve corresponding to the excitation frequency, and
   wherein the controller performs Fourier Transform on the sound pressure signal to confirm the excitation frequency, and measures the rattle noise using a value, among the frequency component of the sound pressure signal, which exceeds the masking curve corresponding to the excitation frequency.

2. The apparatus according to claim 1, wherein the controller compares the masking curve, which indicates a relationship between an audible threshold value and a frequency variation, with the frequency component of the sound pressure signal.

3. The according to claim 1, wherein the signal generator inputs the input signal, in which the excitation frequency is successively changed during a reference period of time, into the audio device.

4. The apparatus according to claim 3, wherein the controller obtains a relationship between the rattle noise and a change of the excitation frequency.

5. The apparatus according to claim 3, wherein the controller confirms a change of the rattle noise during the reference period of time.

6. The apparatus according to claim 1, further comprising:
   a microphone configured to obtain the sound pressure signal generated in response to the input signal.

7. The apparatus according to claim 1, further comprising:
   a display configured to visually display the measured rattle noise.

8. A method for measuring noise, the method comprising steps of:
   inputting, by a signal generator, an input signal, which has an excitation frequency, into an audio device; and
   measuring, by a controller, a rattle noise from a sound pressure signal generated in response to the input signal,
   wherein the measuring the rattle noise includes:
      performing Fourier Transform on the sound pressure signal to confirm the excitation frequency;
      obtaining a masking curve corresponding to the excitation frequency; and
      measuring the rattle noise by using a value exceeding the obtained masking curve, among frequency components of the sound pressure signal.

9. The method according to claim 8, wherein the step of measuring the rattle noise includes:
   comparing the masking curve, which indicates a relationship between an audible threshold value and a frequency variation, with the frequency component of the sound pressure signal.

10. The method according to claim 8, wherein the step of inputting the input signal to the audio device includes:
    inputting the input signal, in which the excitation frequency is successively changed during a reference period of time, into the audio device.

11. The method according to claim 10, wherein the step of measuring the rattle noise includes:
   obtaining a relationship between the rattle noise and a change of the excitation frequency.

12. The method according to claim 10, wherein the step of measuring the rattle noise includes:
   confirming a change of the rattle noise during the reference period of time.

13. The method according to claim 8, further comprising:
   obtaining the sound pressure signal generated in response to the input signal.

14. The method according to claim 8, further comprising:
   visually displaying the measured rattle noise.

* * * * *